United States Patent
Hu et al.

(10) Patent No.: US 10,241,265 B2
(45) Date of Patent: Mar. 26, 2019

(54) APPARATUS FOR ALLEVIATING NONLINEAR TEMPERATURE EFFECT OF ARRAYED WAVEGUIDE GRATINGS

(71) Applicant: Accelink Technologies Co., Ltd., Wuhan (CN)

(72) Inventors: Jiayan Hu, Wuhan (CN); Changan Li, Wuhan (CN); Jiuhong Ling, Wuhan (CN)

(73) Assignee: Accelink Technologies Co., Ltd. (CN)

(*) Notice: Subject to any disclaimer, the term of this patent is extended or adjusted under 35 U.S.C. 154(b) by 0 days.

(21) Appl. No.: 15/570,022

(22) PCT Filed: Dec. 15, 2015

(86) PCT No.: PCT/CN2015/097423
§ 371 (c)(1),
(2) Date: Oct. 27, 2017

(87) PCT Pub. No.: WO2016/173263
PCT Pub. Date: Nov. 3, 2016

(65) Prior Publication Data
US 2018/0164518 A1    Jun. 14, 2018

(30) Foreign Application Priority Data
Apr. 29, 2015  (CN) .......................... 2015 1 0216683

(51) Int. Cl.
*G02B 6/12*        (2006.01)
*G02B 6/122*       (2006.01)
(Continued)

(52) U.S. Cl.
CPC ....... *G02B 6/1203* (2013.01); *G02B 6/12009* (2013.01); *G02B 6/12026* (2013.01); *G02B 6/34* (2013.01); *G02B 6/4266* (2013.01)

(58) Field of Classification Search
None
See application file for complete search history.

(56) References Cited

U.S. PATENT DOCUMENTS 6,603,892 B1 *  8/2003  Ticknor ................... G02B 6/12
                                                          385/130
7,539,368 B2    5/2009  Hasegawa et al.
(Continued)

FOREIGN PATENT DOCUMENTS

CN    101013035 A    8/2007
CN    101019053 A    8/2007
(Continued)

OTHER PUBLICATIONS

Chinese Search Report for Application No. CN2015102166839 dated Apr. 17, 2017.
(Continued)

*Primary Examiner* — Michelle R Connelly
(74) *Attorney, Agent, or Firm* — Lerner, David, Littenberg, Krumholz & Mentlik, LLP (57) ABSTRACT

An apparatus for alleviating a nonlinear temperature effect of an arrayed waveguide grating, comprising an integrated optical circuit base for an arrayed waveguide grating chip and an actuator. The integrated optical circuit base includes a first region, a second region connected by a hinge. The actuator includes two or more actuating rods having a thermal expansion coefficient different from that of the integrated optical circuit base. In different temperature ranges, the first region and the second region are driven by different actuating rods to rotate and/or translate relative to each other, so that the first region and the second region have a nonlinear displacement as the temperature changes, which brings the two parts of the arrayed waveguide grating chip to move relative to each other to accurately compensate drifting of a central wavelength of the arrayed waveguide grating chip in the different temperature ranges.

8 Claims, 8 Drawing Sheets

(51) Int. Cl.
   *G02B 6/34* (2006.01)
   *G02B 6/42* (2006.01)

(56) References Cited

U.S. PATENT DOCUMENTS

| | | | |
|---|---|---|---|
| 7,689,072 B2 | 3/2010 | Bulthuis et al. | |
| 2002/0181871 A1* | 12/2002 | Saito | G02B 6/12014 385/37 |
| 2003/0039441 A1* | 2/2003 | Kashihara | G02B 6/1203 385/37 |
| 2004/0165811 A1* | 8/2004 | Cole | G02B 6/12 385/14 |
| 2004/0208417 A1* | 10/2004 | Purchase | G02B 6/12011 385/14 |
| 2008/0135169 A1* | 6/2008 | Rhee | G02B 6/12016 156/256 |
| 2008/0199130 A1* | 8/2008 | Hasegawa | G02B 6/12014 385/31 |
| 2010/0272394 A1* | 10/2010 | Okamoto | G02B 6/12033 385/37 |
| 2010/0278483 A1* | 11/2010 | Hasegawa | G02B 6/1203 385/37 |
| 2012/0002918 A1* | 1/2012 | Kawashima | G02B 6/1203 385/24 |
| 2012/0195552 A1* | 8/2012 | Hasegawa | G02B 6/1203 385/37 |
| 2012/0195553 A1* | 8/2012 | Hasegawa | G02B 6/12014 385/37 |
| 2013/0142483 A1* | 6/2013 | Hasegawa | G02B 6/34 385/37 |

FOREIGN PATENT DOCUMENTS

| | | |
|---|---|---|
| CN | 101203785 A | 6/2008 |
| CN | 101414030 A | 4/2009 |
| CN | 102313925 A | 1/2012 |
| CN | 104280821 A | 1/2015 |
| CN | 104765103 A | 7/2015 |

OTHER PUBLICATIONS

International Search Report for Application No. PCT/CN2015/097423 dated Mar. 22, 2016.

\* cited by examiner

APPARATUS FOR ALLEVIATING NONLINEAR TEMPERATURE EFFECT OF ARRAYED WAVEGUIDE GRATINGS

CROSS REFERENCE TO RELATED APPLICATIONS

The present application is a national phase entry under 35 U.S.C. § 371 of International Application No. PCT/CN2015/097423, filed Dec. 15, 2015, which claims priority from Chinese Patent Application No. 201510216683.9 filed Apr. 29, 2015, all of which are hereby incorporated herein by reference.

TECHNICAL FIELD

The present disclosure relates to arrayed waveguide gratings in a wave division multiplexing/de-multiplexing system and apparatus for alleviating temperature effect of the arrayed waveguide gratings. The present disclosure belongs to the field of optical communication.

BACKGROUND

In an optical communication system such as a dense wave division multiplexing system, an arrayed waveguide grating (AWG) is a key optical device to carry out multiplexing and de-multiplexing of a plurality of optical signals to thereby increase capacity of the optical communication system. The AWG is an optical device based on a planar optical waveguide, and it generally includes an input waveguide, an input slab waveguide, arrayed waveguides, an output slab waveguide, and output waveguides. Among the arrayed waveguides, every two adjacent waveguides have a constant length difference. A plurality of optical signals with different wavelengths enter into the AWG at a same input port and are diffracted while passing through the input slab waveguide, thereby distributing optical power to each of the arrayed waveguides. Due to the length difference, the arrayed waveguides will cause different transmission phase delays, which coherently superimpose each other in the output slab waveguide so that lights of different wavelengths are outputted to different output ports, thereby de-multiplexing the optical signals. On the contrary, if a plurality of optical signals enter into the AWG from different output ports, they will be multiplexed at the input port.

The dense wave division multiplexing system requires the multiplexing/de-multiplexing device has a stable center wavelength that is controlled within a certain proportion of the channel spacing. For example, in a wave division multiplexing system with 100 GHz channel spacing, accuracy of the center wavelength often needs to be controlled within ±(5%-10%) of the channel spacing, i.e., ±(40-80) pm. For a denser wave division multiplexing system such as 50G and 25G systems, a higher accuracy of the center wavelength is required, which may reach ±40 pm and ±20 pm respectively or even higher, as shown in the following table.

| Channel spacing | Accuracy of central wavelength (acceptable, ±10%, pm) | Accuracy of central wavelength (appropriate, ±5%, pm) | Accuracy of central wavelength (optimal, ±2.5%, pm) |
|---|---|---|---|
| 100 GHz | ±80 | ±40 | ±20 |
| 50 GHz | ±40 | ±20 | ±10 |
| 25 GHz | ±20 | ±10 | ±5 |

At present, the commercially available AWG chips are generally silicon-based planar optical waveguide devices, the center wavelength of which varies relatively greatly with ambient temperature at a rate of about 12 pm/° C. Then, at the operation ambient temperature of the wave division multiplexing system (−5° C. to 65° C.), a drifting quantity of the center wavelength of the AWG chip may be up to about 800 pm, which obviously goes beyond the system requirement. Therefore, the center wavelength of the AWG chip needs to be controlled to make sure that the AWG chip works well at the operation ambient temperature.

Figure 10:
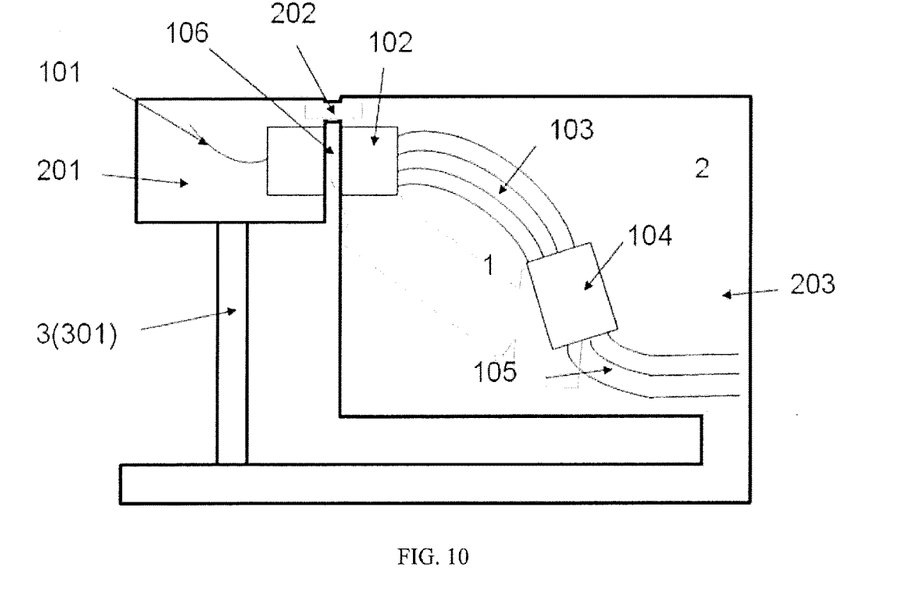
FIG. 10 is a diagram showing a conventional linear compensation solution.

An athermal AWG (AAWG) can effectively control the problem of the center wavelength of the AWG chip drifting with the temperature, and it is a purely passive device that does not consume electric power, so it has attracted lots of attention. Patent CN101019053B (PCT/US2004/014084, May 5, 2004) discloses a conventional AAWG, as shown in FIG. 10, which includes a base, and a chip attached to the base. A slab waveguide of the chip is divided into two parts, and an actuator 301 of the base drives a hinge 202 to move so that waveguides of the chip on the base move with respect to each other to compensate variation of the center wavelength of the AWG chip with the temperature.

Formula 1 shows a relationship between a relative displacement dx of the separated slab waveguide of the AWG and a temperature variation dT:

$$\frac{dx}{dT} = \frac{dx}{d\lambda}\frac{d\lambda}{dT} = R\frac{m}{n_s d}\frac{n_g}{n_c}\frac{d\lambda}{dT} \qquad \text{Formula 1}$$

Here, $n_s$ and $n_c$ are effective refractive indexes of the input/output slab waveguides and the arrayed waveguides of the AWG respectively, $n_g$ is a group refractive index, d is a pitch of adjacent arrayed waveguides on a Rowland circle, m is a diffraction order, R is a focal length of the Rowland circle, and dλ is a variation value of the center wavelength of the AWG.

Assuming an effective length L and a linear expansion coefficient ∂ of the actuator 301, a relative displacement caused by thermal expansion of the actuator 301 is as follows:

$$dx = k \times L \times \partial \times dT \qquad \text{Formula 2}$$

Here, k is a leverage factor between a displacement of the actuator 301 and a relative displacement of a first region and a second region of the base.

The following relationship can be obtained by combining the Formulae 1 and 2:

$$\frac{d\lambda}{dT} = \frac{k \times L \times \partial}{R}\frac{n_s d}{m}\frac{n_c}{n_g} \qquad \text{Formula 3}$$

It can be seen from the Formula 3 that in the technical solution of the Patent, the variation value of the center wavelength of the AWG linearly depends on the variation value of the temperature T.

However, the variation value of the center wavelength λ of an AWG chip may not have a simple linear relationship with the temperature T, but a nonlinear relationship as shown in the following Formula 4:

$$d\lambda = a \times dT^2 + b \times dT + c \qquad \text{Formula 4}$$

Figure 11:
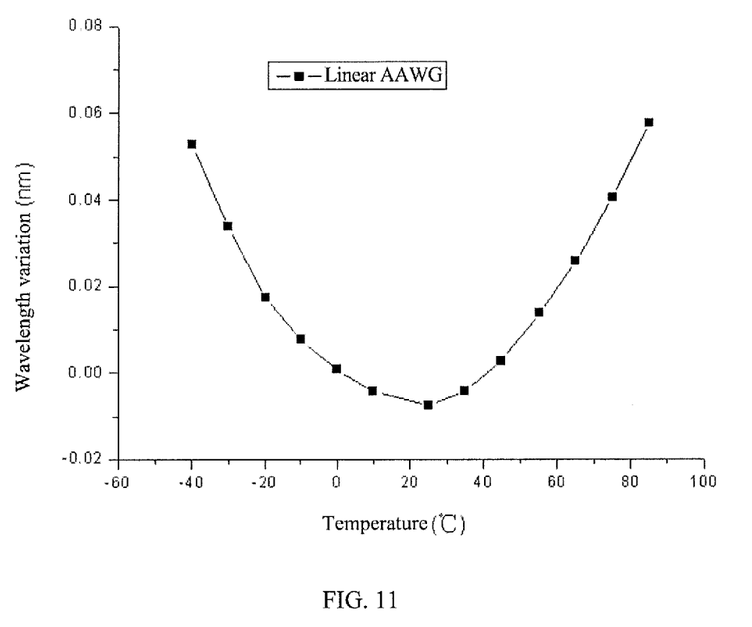

The conventional solution can only compensate the first-order item of the center wavelength variation with the temperature, but cannot compensate the second-order item. FIG. 11 shows dependence of wavelength variation on temperature after linear compensation, which is a parabola curve indicating a residual wavelength/temperature nonlinear effect.

With continuous development of Wavelength Division Multiplexing-Passive Optical Network (WDM-PON) in recent years, the AWG are used in both indoor and outdoor applications, and the operation ambient temperature extends from −5° C.~65° C. to −40° C.~85° C. The drifting quantity of the center wavelength with the temperature becomes larger, and the requirement to the wavelength control becomes higher. it can be seen from FIG. 11 that when the operation ambient temperature extends from −5° C.~65° C. to −40° C.~85° C., the accuracy of the center wavelength would increase from 40 pm to 70 pm, which may go beyond the requirement.

The conventional solution for first-order linear compensation cannot meet the requirements for application of a broader operation temperature range or a denser wave division multiplexing system. There is a need for a nonlinear compensation solution to control the center wavelength of the AAWG more accurately.

Furukawa and Gemfire companies have proposed solutions for nonlinear compensation. For example, U.S. Pat. No. 7,539,368B2 discloses a method of segmental temperature compensation in which the operation temperature range is divided into 3 segments, each of which adopts a different linear compensation to reduce the second-order temperature effect. In this solution, the chip is divided into two parts, and the two parts are free to move with respect to each other. In such a case, either one of the two parts may easily slide and thus be dislocated with respect to the other, which may cause instability of wavelength accuracy and insertion loss.

U.S. Pat. No. 7,689,072B2 discloses a method of nonlinear temperature compensation by filling two different compensating materials, one of which is filled for linear compensation, and the other is added for the second-order nonlinear compensation. In this solution, a plurality of slots are directly added in the light path of the chip, and the compensating materials are filled in the slots. It is easy to manufacture and realize miniaturization. However, the two different compensating materials may interfere with each other, and the second-order compensation effect is not obvious.

So, it is still a problem to propose a solution to solve the nonlinear effect and to ensure stability and reliability of the optical device.

SUMMARY

A main object of the present disclosure is to overcome problems and deficiencies in the prior arts by providing an apparatus for alleviating the nonlinear temperature effect in the optical device.

The basic principal of the present disclosure is as follows.

An actuator in the present disclosure includes a plurality of rods, one of which is not divided and is fixed at two ends of an integrated optical circuit base to implement linear compensation for wavelength/temperature of the AWG, the others are divided to have an aperture in a middle part and are fixed at the two ends of the integrated optical circuit base to implement nonlinear compensation for wavelength/temperature of the AWG. Therefore, the two parts of the integrated optical circuit base may have different relative displacement/temperature coefficients in different temperature ranges. In a temperature range higher than the room temperature, overcompensation may be accomplished, and in a temperature range lower than the room temperature, under-compensation may be accomplished. Thus, variation of the center wavelength of the AWG with temperature may appear as a curve with multiple segments, effectively reducing the residual nonlinear temperature effect. More segments there are, more easily the nonlinear temperature effect may be compensated.

A technical solution of the present disclosure may be as follows.

An apparatus for alleviating nonlinear temperature effect of an arrayed waveguide grating comprises an integrated optical circuit base for an arrayed waveguide grating chip and an actuator, the integrated optical circuit base including a first region, a second region, and a hinge connecting the first region and the second region to enables the first region and the second region to rotate and/or translate relative to each other, the arrayed waveguide grating chip being fixed on the integrated optical circuit base, the arrayed waveguide grating chip being divided into two parts which are fixed on the first region and the second region of the integrated optical circuit base, respectively, the actuator including a combination of two or more actuating rods having a thermal expansion coefficient different from that of the integrated optical circuit base, wherein: in different temperature ranges, the first region and the second region are driven mainly by different actuating rods to rotate and/or translate relative to each other so that the first region and the second region generate a nonlinear displacement as the temperature changes and carry two parts of the arrayed waveguide grating chip to move relative to each other, thereby accurately compensating for a drifting quantity of the central wavelength of the arrayed waveguide grating chip in different temperature ranges.

There is no aperture disposed in the middle of at least one of the actuating rods or between the at least one of the actuating rods and the first or second region of the integrated optical circuit base. There is an aperture disposed in the middle of at least one of the actuating rods or between the at least one of the actuating rods and the first or second region of the integrated optical circuit base. The aperture may be open or closed up due to thermal expansion of the actuating rod in different temperature ranges.

The actuating rods include an overcompensation structure, a under-compensation structure, or a combination of overcompensation and under-compensation structures, wherein: an actuating rod provided with the aperture is fixed at an end in a recession portion of the base to form the overcompensation structure, and an actuating rod provided with the aperture is fixed at an end on a protrusion portion of the base to form the under-compensation structure.

The respective actuating rods may have different effective lengths and/or leverage factors and/or thermal expansion coefficients such that products of the effective lengths, the leverage factors and the thermal expansion coefficients of the actuating rods are different from each other.

A difference of the thermal expansion coefficient of the actuator and the thermal expansion coefficient of the integrated optical circuit base is equal to or greater than 50%.

An aperture dividing the arrayed waveguide grating chip into two parts is provided at any position of an input slab waveguide or an arrayed waveguide or an output slab waveguide of the arrayed waveguide grating, and the aperture is positioned over the hinge on the integrated optical circuit base. The aperture is 1 μm~50 μm.

The aperture of the arrayed waveguide grating chip may be filled with refractivity matching material, which has a refractive index the same as or close to the refractive index of the waveguide material of the separated portion.

The actuator includes a first actuating rod, a second actuating rod and a third actuating rod, and the first actuating rod, the second actuating rod and the third actuating rod are fixedly connected to the first region and the second region of the integrated optical circuit base. The aperture is provided in the middle of the second actuating rod and the third actuating rod, or between the second and third actuating rods and the first or second region of the integrated optical circuit base. One end of the second actuating rod is fixed in a recession portion of the base to form the overcompensation structure, and one end of the third actuating rod is fixed on a protrusion portion of the base to form the under-compensation structure. The actuating rods have a thermal expansion coefficient, an effective length and a leverage factor satisfying the following relation: $k_2 \times L_2 \times \partial_2 > k_1 \times L_1 \times \partial_1 > k_3 \times L_3 \times \partial_3$, where $L_1$, $\theta_1$, $k_1$ are the effective length, the thermal expansion coefficient and the leverage factor relative to the base of the first actuating rod, $L_2$, $\partial_2$, $k_2$ are the effective length, the thermal expansion coefficient and the leverage factor relative to the base of the second actuating rod, and $L_3$, $\partial_3$, $k_3$ are the effective length, the thermal expansion coefficient and the leverage factor relative to the base of the third actuating rod.

The actuator includes a first actuating rod and a second actuating rod, and the first actuating rod and the second actuating rod are fixedly connected to the first region and the second region of the integrated optical circuit base. The aperture is provided in the middle of the second actuating rod, or between the second actuating rod and the first or second region of the integrated optical circuit base. One end of the second actuating rod is fixed in a recession portion of the base to form the overcompensation structure. The actuating rods have a thermal expansion coefficient, an effective length and a leverage factor satisfying the following relation: $k_2 \times L_2 \times \partial_2 > k_1 \times L_1 \times \partial_1$, where $L_1$, $\partial_1$, $k_1$ are the effective length, the thermal expansion coefficient and the leverage factor relative to the base of the first actuating rod, and $L_2$, $\partial_2$, $k_2$ are the effective length, the thermal expansion coefficient and the leverage factor relative to the base of the second actuating rod.

The actuator includes a first actuating rod and a third actuating rod, and the first actuating rod and the third actuating rod are fixedly connected to the first region and the second region of the integrated optical circuit base. The aperture is provided in the middle of the third actuating rod, or between the third actuating rod and the first or second region of the integrated optical circuit base. One end of the third actuating rod is fixed in a protrusion portion of the base to form the under-compensation structure. The actuating rods have a thermal expansion coefficient, an effective length and a leverage factor satisfying the following relations: $k_1 \times L_1 \times \partial_1 > k_3 \times L_3 \times \partial_3$, where $L_1$, $\partial_1$, $k_1$ are the effective length, the thermal expansion coefficient and the leverage factor relative to the base of the first actuating rod, and $L_3$, $\partial_3$, $k_3$ are the effective length, the thermal expansion coefficient and the leverage factor relative to the base of the third actuating rod.

The actuator includes a first actuating rod, a second actuating rod, a third actuating rod, a fourth actuating rod, and a fifth actuating rod. The first actuating rod is fixedly connected to the first region and the second region of the integrated optical circuit base. The aperture is provided in the middle of the second actuating rod, the third actuating rod, the fourth actuating rod and the fifth actuating rod, or between the second, third, fourth and fifth actuating rods and the first or second region of the integrated optical circuit base. One end of the second and fourth actuating rods is fixed in a recession portion of the base to form the overcompensation structure, and one end of the third and fifth actuating rod is fixed on a protrusion portion of the base to form the under-compensation structure. The actuating rods have a thermal expansion coefficient, an effective length and a leverage factor satisfying the following relations: $k_4 \times L_4 \times \partial_4 > k_2 \times L_2 \times \partial_2 > k_1 \times L_1 \times \partial_1 > k_3 \times L_3 \times \partial_3 > k_5 \times L_5 \times \partial_5$, where $L_i$, $\partial_i$, $k_i$ ($5 \geq i \geq 1$) are the effective length, the thermal expansion coefficient and the leverage factor relative to the base of the i-th actuating rod.

The present disclosure has the following advantages:

The apparatus of the present disclosure can effectively alleviate the wavelength/temperature nonlinear effect of the AWG chip.

BRIEF DESCRIPTION OF THE DRAWINGS

FIG. 11 is a graph showing a temperature graph after a conventional linear compensation, wherein,

| | |
|---|---|
| 1. AWG chip; | 101. input waveguide; |
| 102. input slab waveguide; | 103. arrayed waveguide; |
| 104. output slab waveguide; | 105. output waveguide; |

| | |
|---|---|
| 106. separating end surface of the chip; | 2. base; |
| 201. first region of the base; | 202. hinge; |
| 203. second region of the base; | 3. actuator; |
| 301. first actuating rod; | 302. second actuating rod; |
| 303. third actuating rod; | 304. fourth actuating rod; |
| 305. fifth actuating rod. | |

DESCRIPTION OF EMBODIMENT

Hereinafter, specific embodiments of the present disclosure are described with reference to the accompanying drawings.

Figure 9:
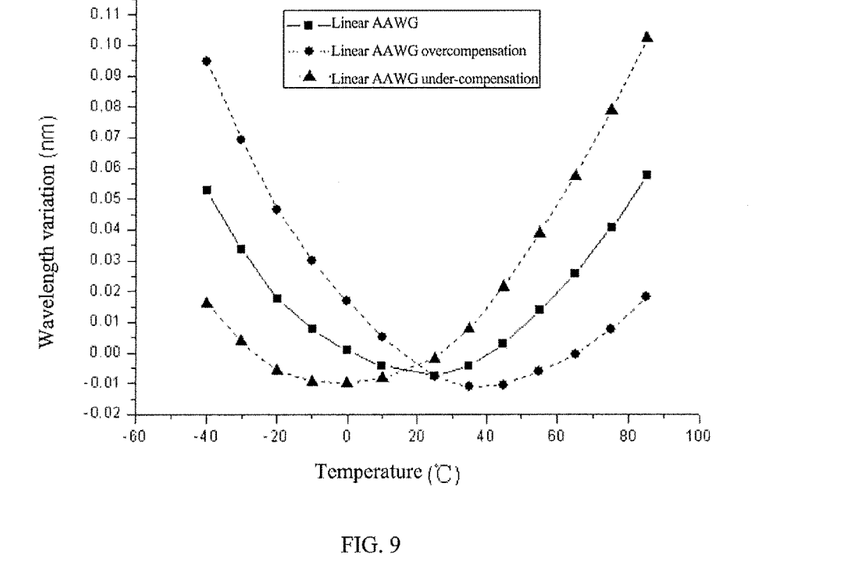
FIG. 9 is a graph showing temperature curves of a conventional linear compensation with different compensation effects.

In a linear AAWG, when a compensating factor $d\lambda/dT$ is in consistence with a wavelength/temperature coefficient of the chip, it is a full compensation. When the compensating factor $d\lambda/dT$ is larger than the wavelength/temperature coefficient of the chip, it is called overcompensation. When the compensating factor $d\lambda/dT$ is less than the wavelength/temperature coefficient of the chip, it is called under-compensation. Shown in FIG. 9 are temperature curves of the three compensating effects. In the present disclosure, different compensating effects are combined to implement a segmental linear compensation so as to alleviate the residual nonlinear effect of the linear compensation.

Figure 1A:
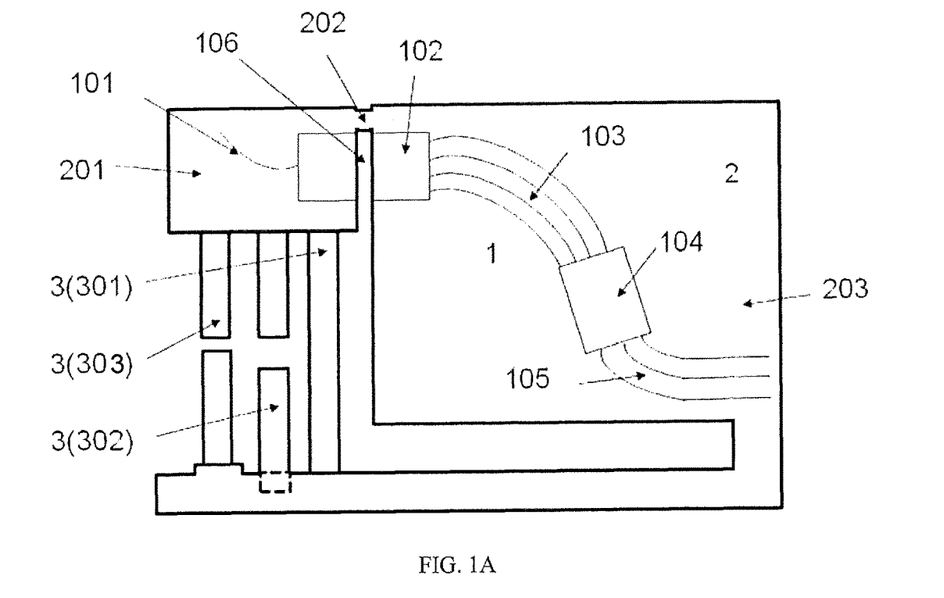
FIG. 1A is a schematic view showing a general structure of the present disclosure.
Figure 2:
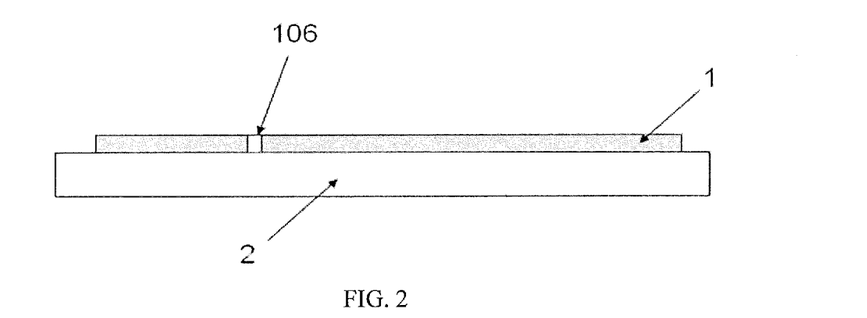
FIG. 2 shows a schematic sectional view of the general structure of the present disclosure.
Figure 3:
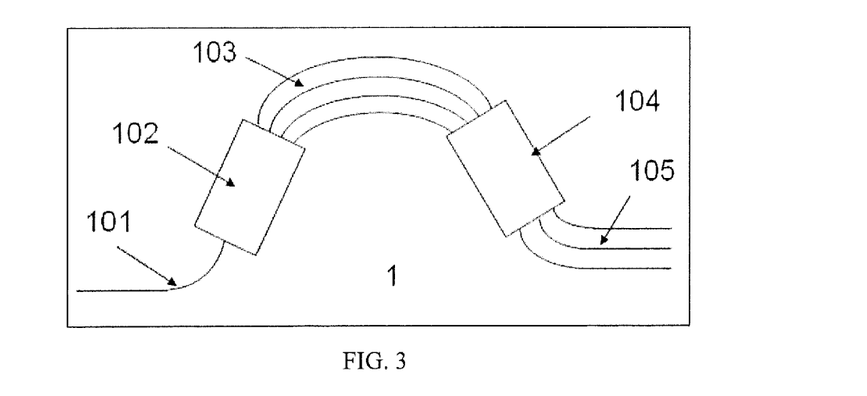
FIG. 3 is a schematic view showing an AWG chip of the present disclosure.

The present disclosure relates to an apparatus for alleviating the nonlinear temperature effect of the arrayed waveguide grating. FIG. 1A is a schematic view showing a general structure of the present disclosure, which includes an arrayed waveguide grating (AWG) chip 1, an integrated optical circuit base 2, and an actuator 3. FIG. 2 is a schematic sectional view of the general structure of the present disclosure showing the AWG chip 1 is fixedly provided on the base 2 in a proper manner. A schematic view of the AWG chip 1 is shown in FIG. 3, which includes an input waveguide 101, an input slab waveguide 102, an arrayed waveguide 103, an output slab waveguide 104, and an output waveguide 105. The input waveguide 101 may direct an input light beam into the input slab waveguide 102. The input slab waveguide 102 is connected through the arrayed waveguide 103 to the output slab waveguide 104 at a certain angle, and the input slab waveguide 102 distributes, by diffraction, optical power of optical signals with different wavelengths to each port of the arrayed waveguide 103. Adjacent waveguides in the arrayed waveguide 103 have a constant length difference. Due to the length difference, the arrayed waveguide 103 generates different transmission phase delays to the optical signals with different wavelengths, which are superimposed coherently in the output slab waveguide 104 so that the optical signals with different wavelengths are outputted through different ports of the output waveguide 105. The AWG chip is divided into two parts, and the division may be positioned on the input slab waveguide 102, the output slab waveguide 104, or the arrayed waveguide 103.

Figure 4:
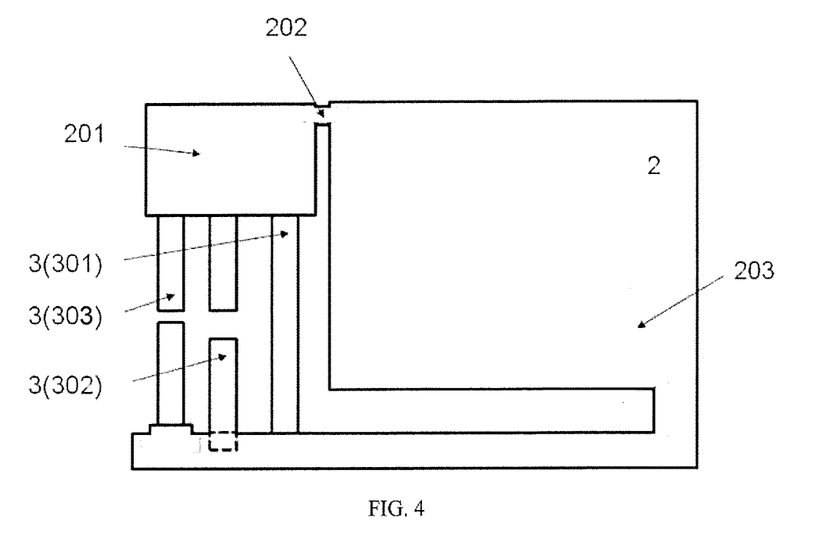
FIG. 4 is a schematic view showing a base and an actuator of the present disclosure.

FIG. 4 is a schematic view showing a typical structure of the integrated optical circuit base and the actuator in an initial status. The integrated optical circuit base 2 may include a first region 201, a second region 203, and a hinge 202 connecting the first region 201 and the second region 203. The hinge 202 may enable rotation or other relative displacement of the first region 201 with respect to the second region 203. The integrated optical circuit base 2 may have a relative low first thermal expansion coefficient such that it is not easy to deform as the temperature changes. The base 2 may be made of glass, quartz, metal, alloy or other composite material, or the like. The AWG chip 1 is secured on the first region 201 and the second region 203 of the integrated optical circuit base 2 such that the light path of the AWG chip 1 may change through the relative movement (rotation or displacement) of the first region 201 relative to the second region 203.

The actuator 3 includes two or more actuating rods connected between the first region 201 and the second region 203 of the integrated optical circuit base 2 to drive the first region 201 and the second region 203 to move relative to each other. The actuating rods have a thermal expansion coefficient different from that of the integrated optical circuit base 2, and the difference is equal to or greater than 50%. Generally, the thermal expansion coefficient of the actuating rods is larger than the thermal expansion coefficient of the integrated optical circuit base so that the actuating rods may easily deform as the temperature changes, which causes the first region 201 and the second region 203 of the integrated optical circuit base 2 to move relative to each other. Among the actuating rods, at least one first actuating rod 301 has two ends fixed to the first region 201 and the second region 203 of the integrated optical circuit base 2, respectively. The first actuating rod 301 has no aperture formed in its middle part. At least one second actuating rod 302/third actuating rod 303/fourth actuating rod 304/fifth actuating rod 305 each have two ends fixed to the first region 201 and the second region 203 of the integrated optical circuit base 2, respectively. The second actuating rod 302/the third actuating rod 303/the fourth actuating rod 304/the fifth actuating rod 305 each have an aperture formed in its middle part. Alternatively, one end of the at least one second actuating rod 302/third actuating rod 303/fourth actuating rod 304/fifth actuating rod 305 is fixed to the first region 201 or the second region 203 of the integrated optical circuit base 2, while the other end is separated from the second region 203 or the first region 201 of the integrated optical circuit base 2 with an aperture therebetween. Width of the aperture may change as the temperature changes. When the temperature goes up or down, the aperture may be open or closed. In addition, respective actuating rods of the actuator need to have different thermal expansion coefficients or effective lengths, and different leverage factors such that they cause different amounts of displacement at the hinge 202, thereby achieving overcompensation or under-compensation effects. The first actuating rod 301/the second actuating rod 302/the third actuating rod 303/the fourth actuating rod 304/the fifth actuating rod 305 are combined together to work, and they cause a nonlinear displacement of the first region 201 and the second region 203 of the base relative to each other about the hinge 202, and thus two separated parts of the arrayed waveguide grating chip 1 move relative to each other to alleviate the nonlinear effect of the central wavelength of the arrayed waveguide grating chip 1 with the temperature.

Structure and operation principle of the present disclosure will be described in detail in connection with a combination of 2-5 actuating rods. However, those skilled in the art would understand that the number of the actuating rods may vary flexibly according to actual needs, and it is not limited to 2-5 in the embodiments of the present disclosure. For example, there may be 9 actuating rods, 21 actuating rods, or more actuating rods.

As shown in FIG. 1A, the AWG chip 1 is fixed to the base 2 by, for example, adhesive, welding, or other manners. The AWG chip 1 is divided into two parts at a portion near the hinge 202 of the base 2, generating dividing end surfaces 106. The two divided parts can move relative to each other, which causes variation of the central wavelength of the AWG chip to compensate drifting of the central wavelength of the AWG chip 1 as the temperature changes.

The dividing end surfaces 106 of the AWG chip 1 can be implemented by laser cutting, water cutting, chemical etching, saw cutting or the like, and the cutting may be along a straight line, a curve, or other shapes. Cutting width may be controlled within 1-50 μm to ensure that the AWG chip 1 after cutting can generate a relative movement as the temperature changes. If the aperture width is too small, the dividing end surfaces would move and collide with each other as the temperature changes, causing breakage of the chip. If the aperture width is too large, the additional insertion loss would be relatively large. The dividing end surfaces should not be exposed to air, and the aperture should match the refractive index of the AWG chip 1. Generally, matching glue with a refractive index close to that of the core layer of the AWG chip is coated on the dividing end surfaces 106 of the chip and fills the entire apertures on the light path. Alternatively, the refractive index matching can be implemented by film plating or the like.

As shown in FIG. 1A, based on the conventional linear compensation solution, the first actuating rod 301 is kept, and two actuating rods, i.e., the second actuating rod 302 and the third actuating rod 303, are added. The second actuating rod 302 has a largest length, the first actuating rod 301 has a shorter length, and the third actuating rod 303 has a shortest length. The second actuating rod 302 and the third actuating rod 303 have been divided to have an aperture to alleviate the nonlinear temperature effect in a high temperature range (higher than the room temperature) and in a low temperature range (lower than the room temperature).

Assuming that the first actuating rod 301 has an effective length $L_1$, a thermal expansion coefficient $\partial_1$, and a leverage factor $k_1$ relative to the base 2, the second actuating rod 302 has an effective length $L_2$, a thermal expansion coefficient $\partial_2$, and a leverage factor $k_2$ relative to the base 2, and the third actuating rod 303 has an effective length $L_3$, a thermal expansion coefficient $\partial_3$, and a leverage factor $k_3$ relative to the base 2. These parameters satisfy the following relation:

$$k_2 \times L_2 \times \partial_2 > k_1 \times L_1 \times \partial_1 > k_3 \times L_3 \times \partial_3 \quad \text{Formula 5}$$

Regarding to the leverage factor k, it can be understood as a relation between the displacement of the actuator and the displacement of the hinge 202. The leverage factor may be determined by the structure of the base, the length of the actuating rod, and the mounting position of the actuating rod on the base, and it may be simulated by computer software when designing the structure of the base. Take the first actuating rod 301 as an example. As the temperature changes, the length of the first actuating rod 301 changes by an amount of 30 μm due to thermal expansion, which causes the hinge 202 to deform so that the first region 201 and the second region 202 of the base generate a relative movement, including variation of angle and displacement. For the AWG chip, variation value of the displacement is effective, and variation of the angle is not necessary. Thus, the angle variation is ignored, and only the variation value of displacement is taken. In this case, the displacement of the first region 201 relative to the second region 203 caused by the hinge 202 is 15 μm, then the leverage factor of the first actuating rod 301 is 0.5. That is, the leverage factor is a ratio of spacing variation of the first region and the second region of the base under action of the actuating rod with an expansion/contraction length of the actuating rod. A larger leverage factor means a larger effect of the actuating rod to the spacing variation of the first region and the second region of the base, and vice versa.

In a room temperature range, the first actuating rod 301 functions to implement linear compensation, and the displacement of the chip caused by the base is:

$$dx = k_1 \times L_1 \times \partial_1 \times dT \quad \text{Formula 6}$$

Figure 1B:
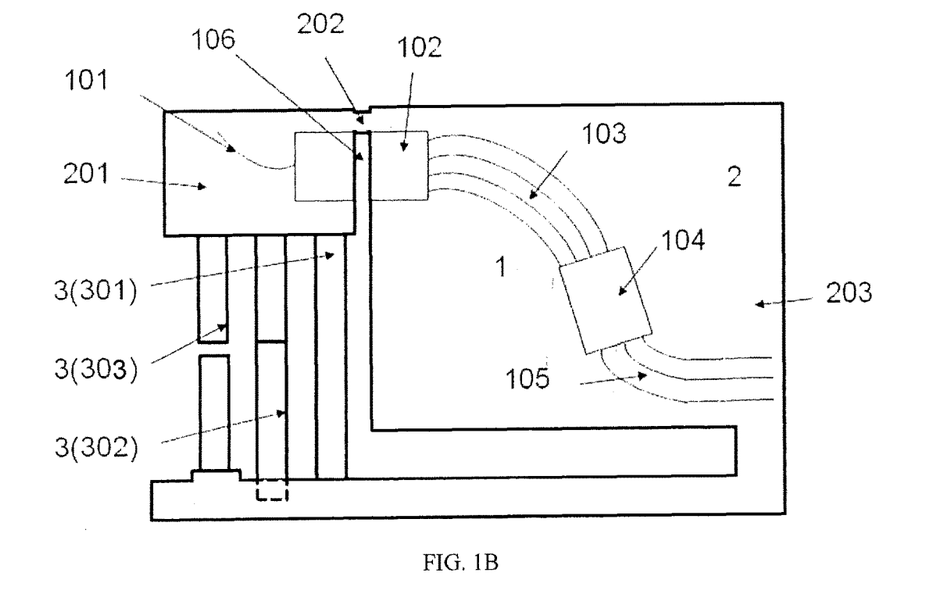
FIG. 1B is a schematic view showing the structure of the present disclosure in a high temperature range.

When the temperature increases to a certain range, the three actuating rods each have thermal expansion. By appropriately setting the aperture width of the second actuating rod 302 and the aperture width of the third actuating rod 303, the aperture of the second actuating rod 302 may close up, while the aperture of the third actuating rod 303 may be still open, and the third actuating rod 303 does not contribute to temperature compensation, as shown in FIG. 1B. Then, in the high temperature range, the first actuating rod 301 and the second actuating rod 302 functions concurrently, and a relatively larger one of the displacement values introduced by the first actuating rod 301 and the second actuating rod 302 will prevail.

At this time, the displacement of the chip caused by the base 2 is:

$$dx = k_2 \times L_2 \times \partial_2 \times dT \quad \text{Formula 7}$$

Thus, overcompensation occurs in the high temperature range, which pulls down a right half of the temperature/wavelength variation parabola curve after linear compensation towards a horizontal level.

If the temperature decreases to a certain range from the room temperature, the actuator contracts. The second actuating rod 302 has a largest amount of contraction, and its aperture becomes wider, so it does not have a temperature compensation effect. Since the length of the first actuating rod 301 is larger than that of the third actuating rod 303, the first actuating rod 301 has a larger amount of contraction than that of the third actuating rod 303. Therefore, the aperture of the third actuating rod 303 closes up, and the third actuating rod 303 starts to contribute to temperature compensation. In this case, a relatively smaller one of the displacement values introduced by the first actuating rod 301 and the third actuating rod 303 will prevail.

At this time, the relative displacement of the chip caused by the base 2 is:

$$dx = k_4 \times L_4 \times \partial_4 \times dT \quad \text{Formula 8}$$

Thus, under-compensation occurs in the low temperature range, which pulls down a left half of the temperature/wavelength variation parabola curve after linear compensation towards a horizontal level.

Based on this principle, the number of the actuating rods of the actuator can be increased, for example, from three to five, of which two rods are for the high temperature range, two rods for the low temperature range, and one rod for the room temperature range. In this case, the high temperature range and the low temperature range can be divided into more temperature ranges. At this time, the relative displacement of the AWG chip 1 caused by the base 2 is:

$$dx = \Sigma k_i \times L_i \times \partial_i \times dT_i \; (i>3) \quad \text{Formula 9}$$

By doing so, both the left side and the right side of the temperature/wavelength variation parabola curve after linear compensation shown in FIG. 11 tend to the horizontal level more, until become a substantially horizontal line, which obviously alleviates the nonlinear wavelength/temperature effect of the AWG chip 1.

In an embodiment of the present disclosure, the leverage factors of different actuating rods of the actuator relative to the hinge 202 of the base 2 may have at least two different numerical values.

Figure 1C:
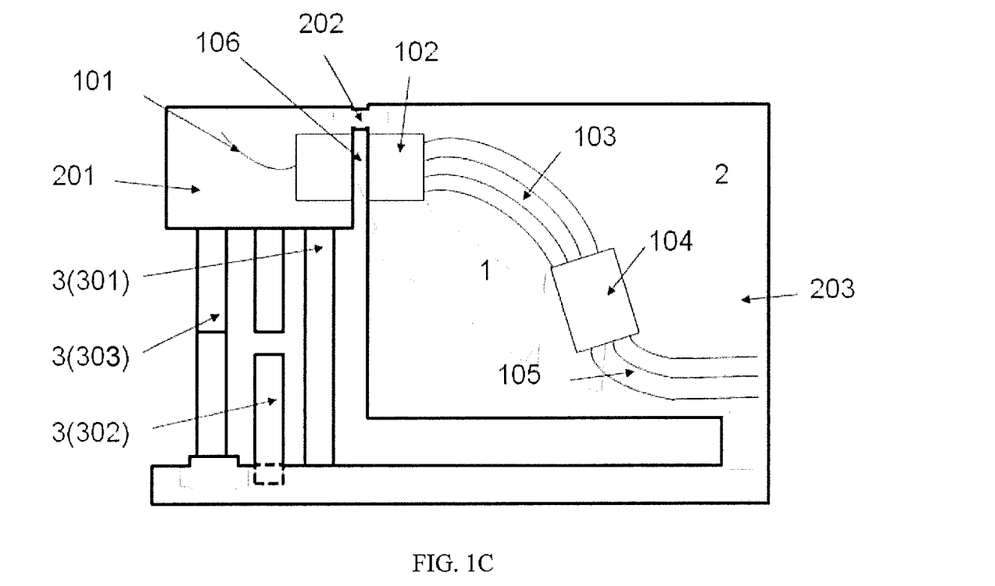
FIG. 1C is a schematic view showing the structure of the present disclosure in a low temperature range.

In the first embodiment shown in FIGS. 1A-1C, in order to implement wavelength compensation in a wider temperature range such as −40° C.~85° C., the entire operation temperature range is divided into three segments, for example, a low temperature range of −40° C.~−10° C., a room temperature range of −10° C.~50° C., and a high temperature range of 50° C.~85° C. In FIG. 1A, the first actuating rod 301 is connected with the first region 201 and the second region 203 of the integrated optical circuit base 12 and there is no aperture therebetween. The second actuating rod 302 and the third actuating rod 303 are divided to have an aperture. The first actuating rod 301, the second actuating rod 302, the third actuating rod 303 are used for compensations in the room temperature range, the high temperature range and the low temperature range, respectively.

The three actuating rods may be made of metal such as copper and have a thermal expansion coefficient of 17.7× $10^{-6}$/° C. Each actuating rod may have a different length. The length of the first actuating rod 301 may be 37.4 mm, the length of the second actuating rod 301 may be 39.5 mm, and the length of the third actuating rod 303 may be 25.7 mm. In FIG. 1, a dash line at a position where the second actuating rod 302 contacts the base 203 shows a part of the second actuating rod 302 that is longer than the first actuating rod 301, and at this position the base 203 has a recession portion (as shown by the recessed dash line). The lower end of the second actuating rod 302 is fixed in the recession portion. Since the third actuating rod 303 is shorter than the first actuating rod 301, the base 203 has a protrusion part to contact the third actuating rod 303 (as shown by the protruded solid line). The protrusion portion is an integral part of the base 203 and they have the same thermal expansion coefficient. The lower end of the third actuating rod 303 is fixed to the protrusion portion of the base 203. In the present embodiment, the thermal expansion coefficient, the effective length and the leverage factor of the actuating rods satisfy the following relation: $k_2 \times L_2 \times \partial_2 > k_1 \times L_1 \times \partial_1 > k_3 \times L_3 \times \partial_3$, where $L_1$, $\partial_1$, $k_1$ are the effective length, the thermal expansion coefficient and the leverage factor relative to the base of the first actuating rod 301, $L_2$, $\partial_2$, $k_2$ are the effective length, the thermal expansion coefficient and the leverage factor relative to the base of the second actuating rod 302, and $L_3$, $\partial_3$, $k_3$ are the effective length, the thermal expansion coefficient and the leverage factor relative to the base of the third actuating rod 303. By adjusting the mounting position of the actuator, the leverage factor of the first actuating rod 301 relative to the base may be set as 0.55, the leverage factor of the second actuating rod 302 relative to the base may be set as 0.65, and the leverage factor of the third actuating rod 303 relative to the base may be set as 0.6. The second actuating rod 302 and the third actuating rod 303 have been divided to have an aperture. In the room temperature range, the first actuating rod 301 functions to contribute to compensation, and the second actuating rod 302 and the third actuating rod 303 do not contribute to compensation due to the aperture. At this time, a relative displacement of the dividing surfaces of the chip is:

$$dx_1 = 0.55 \times 37.4 \times 10^{-3} \times 17.7 \times 10^{-6} \times dT_1 = 0.364 \times 10^{-6} \times dT_1 \quad \text{Formula 10}$$

It may be calculated from the parameters of the AWG that a relation of the relative displacement of the dividing surfaces of the chip with the wavelength variation is: a relative displacement of 1 μm corresponding to a wavelength variation of 33 pm.

Then, a relation of wavelength/temperature can be obtained as follows:

$$d\lambda_1 = 0.364 \times 33 \times 10^{-12} \times dT_1 = 12.01 \times 10^{-12} \times dT_1 \quad \text{Formula 11}$$

A first order item of the wavelength/temperature coefficient of the AWG chip 1 as used is 12 pm/° C. It can be seen that the first actuating rod 301 can implement linear compensation very well in the room temperature range.

In the high temperature range, the second actuating rod 302 expands, and its aperture closes up, as shown in FIG. 1B. At this time, both the first actuating rod 301 and the second actuating rod 302 function to carry out compensation concurrently, and one of them having a relatively larger displacement will prevail. It may be calculated from Formula 12 that the wavelength/temperature coefficient induced by the second actuating rod 302 is 15 pm/° C., which is larger than the wavelength/temperature coefficient induced by the first actuating rod 301, and thus the second actuating rod 302 will dominate the compensation.

$$d\lambda_2 = 0.65 \times 39.5 \times 10^{-3} \times 17.7 \times 10^{-6} \times 33 \times 10^{-12} \times dT_2 = 15 \times 10^{-12} \times dT_2 \quad \text{Formula 12}$$

As seen, overcompensation occurs in the high temperature range, which pulls down an upturned part at right side of the temperature/wavelength parabola curve after the linear compensation.

In the low temperature range, all of the three actuating rods contracts. The second actuating rod 302 has a relatively larger amount of contraction, and its aperture becomes larger so that the second actuating rod 302 does not contribute to compensation. The third actuating rod 303 has a smallest amount of contraction. Since the length of the first actuating rod 301 is larger than that of the third actuating rod 303, the first actuating rod 301 has an amount of contraction larger than that of the third actuating rod 303. Therefore, as shown in FIG. 1C, the aperture of the third actuating rod 303 closes up, and the third actuating rod 303 starts to contribute to compensation. It may be calculated from Formula 13 that a wavelength/temperature coefficient induced by the third actuating rod 303 is 9 pm/° C., which is smaller than that induced by the first actuating rod 301. So, the third actuating rod 303 will dominate the compensation.

$$d\lambda_4 = 0.6 \times 25.7 \times 10^{-3} \times 17.7 \times 10^{-6} \times 33 \times 10^{-12} \times dT_4 = 9 \times 10^{-12} \times dT_4 \quad \text{Formula 13}$$

As seen, under-compensation occurs in the low temperature range, which pulls down an upturned part at left side of the temperature/wavelength parabola curve after the linear compensation.

Figure 8A:
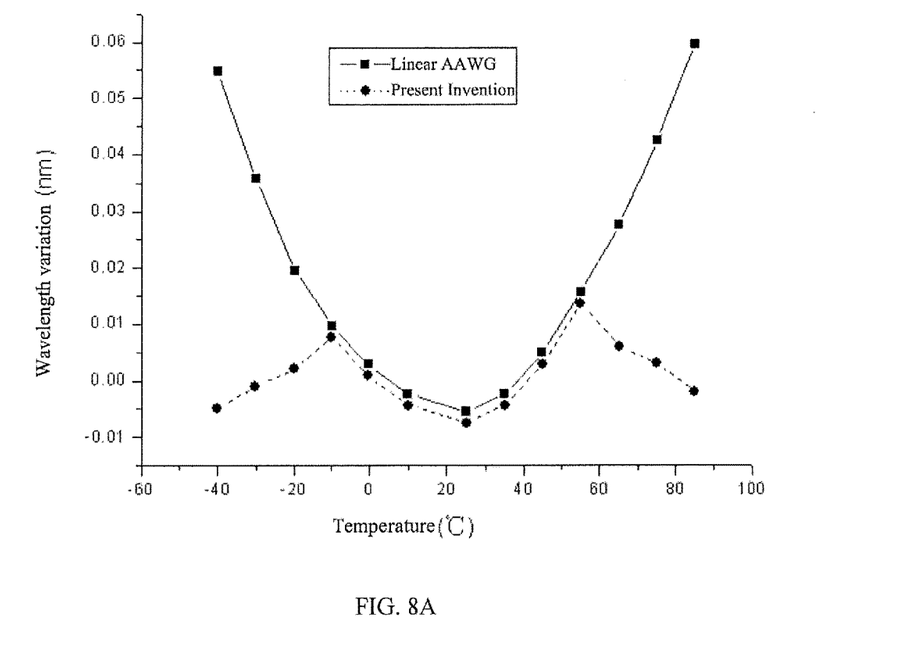
FIG. 8A is a graph showing comparison of a temperature curve of the first embodiment of the present disclosure and a temperature curve of a conventional linear compensation solution.

After nonlinear compensation, a wavelength/temperature curve of the AWG chip is shown in FIG. 8A. As compared to the conventional linear compensation solution, the drifting quantity of the wavelength can be reduced from 65 pm to 20 pm in a range of −40° C.~85° C.

Based on the idea of the present disclosure, many solutions can be contemplated.

Figure 5:
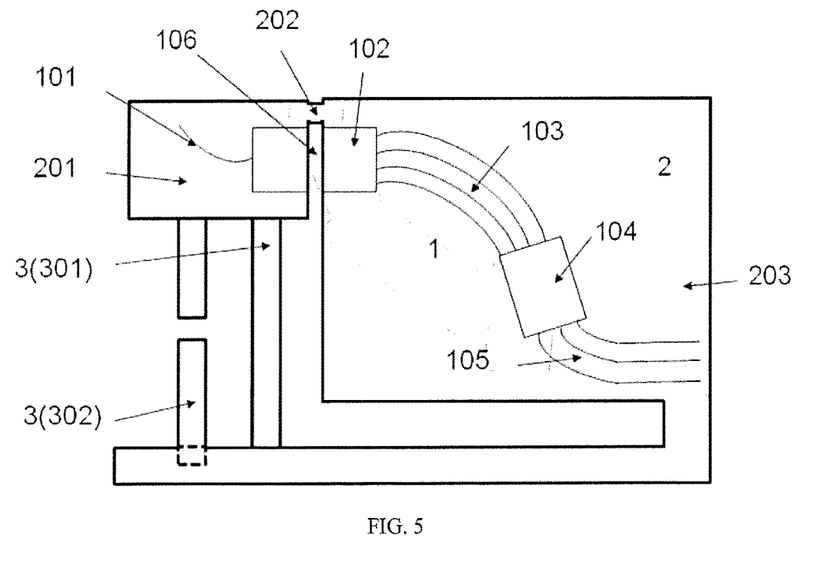
FIG. 5 is a schematic view showing a structure according to a second embodiment of the present disclosure.

FIG. 5 shows a second embodiment in which the entire operation temperature range is divided into two temperature ranges, i.e., a low temperature range of −40° C.~50° C., and a high temperature range of 50° C.~85° C. The actuator may include a first actuating rod 301 and a second actuating rod 302, which both are made of metal such as copper and have a thermal expansion coefficient of 17.7×$10^{-6}$/° C. The first actuating rod 301 is connected to the first region 201 and the second region 203 of the integrated optical circuit base and there is no aperture therebetween. The second actuating rod 302 is connected at two ends to the first region 201 and the second region 203, respectively, and the second actuating rod 302 is divided to have an aperture. As shown in FIG. 5, the linear compensation adopts an under-compensation structure. The first actuating rod 301 has a length of 31 mm, and the second actuating rod 302 has a length of 42 mm. FIG. 5 shows a part of the second actuating rod 302 longer than the first actuating rod 301 by a dash line at a position where the second actuating rod 302 contacts the base 203. The base 203 has a recession portion and the lower end of the second actuating rod 302 is fixed in the recession portion. In the present embodiment, the effective length, the thermal expansion coefficient and the leverage factor of the actuating rods satisfy the following relation: $k_2 \times L_2 \times \partial_2 > k_1 \times L_1 \times \partial_1$, where $L_1$, $\partial_1$, $k_1$ are the effective length, the thermal expansion coefficient and the leverage factor relative to the base of the first actuating rod 301, and $L_2$, $\partial_2$, $k_2$ are the effective length, the thermal expansion coefficient and the leverage factor relative to the base of the second actuating rod 302. By adjusting the mounting position of the actuator, the leverage factor of the first actuating rod 301 relative to the base may be set as 0.5, and the leverage factor of the second actuating rod 302 relative to the base may be set as 0.6.

In the low temperature range, the first actuating rod 301 functions to contribute to compensation. The second actuating rod 302 has the aperture, and it does not contribute to compensation. A relation of wavelength/temperature can be obtained as follows:

$$d\lambda_1 = 0.5 \times 31 \times 10^{-3} \times 17.7 \times 10^{-6} \times 33 \times 10^{-12} \times dT_2 = 9 \times 10^{-12} \times dT_2 \quad \text{Formula 14}$$

In the high temperature range, due to thermal expansion, the second actuating rod 302 expands, its effective length becomes larger, and the aperture closes up. The second actuating rod 302 begins to contribute to compensation.

At this time, a relation of wavelength/temperature can be obtained as follows:

$$d\lambda_2 = 0.6 \times 42 \times 11^{-3} \times 17.7 \times 10^{-6} \times 33 \times 10^{-12} \times dT_2 = 14.7 \times 10^{-12} \times dT_2 \quad \text{Formula 15}$$

Figure 8B:
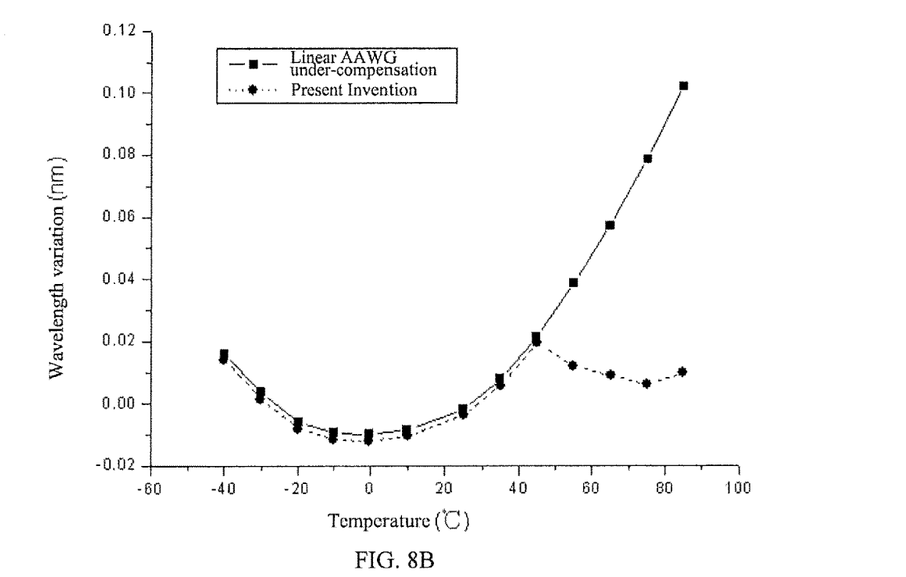
FIG. 8B is a graph showing comparison of a temperature curve of the second embodiment of the present disclosure and a temperature curve of a conventional linear compensation solution.

A temperature curve after compensation is shown in FIG. 8B. The drifting quantity of the wavelength can be reduced from 110 pm to 30 pm in a range of −40° C.~85° C.

Figure 6:
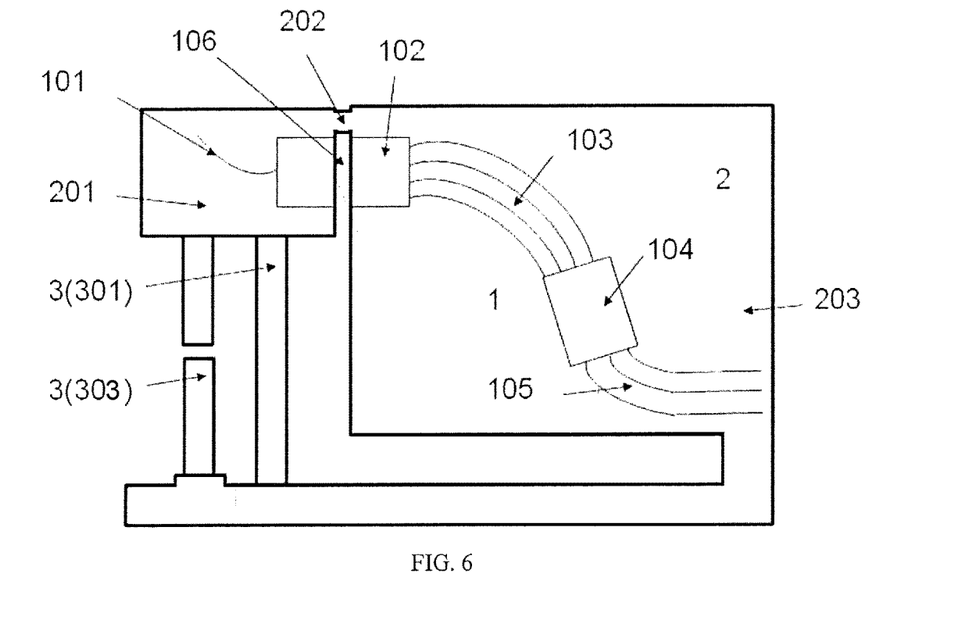
FIG. 6 is a schematic view showing a structure according to a third embodiment of the present disclosure.

FIG. 6 shows a third embodiment in which the entire operation temperature range is divided into two temperature segments, i.e., a low temperature range of −40° C.~0° C., and a high temperature range of 0° C.~85° C. The actuator includes a first actuating rod 301 and a third actuating rod 303, which both are made of metal such as copper and have a thermal expansion coefficient of $17.7 \times 10^{-6}/°$ C. The first actuating rod 301 is connected to the first region 201 and the second region 203 of the integrated optical circuit base and there is no aperture therebetween. The third actuating rod 303 is connected at two ends to the first region 201 and the second region 203, respectively, and the third actuating rod 303 is divided to have an aperture in the middle thereof. The first actuating rod 301 has an overcompensation structure for the linear compensation. The first actuating rod 301 has a length of 40 mm, and the third actuating rod 303 has a length of 29 mm. Since the third actuating rod 303 is shorter than the first actuating rod 301, the base 203 has a protrusion portion to contact the third actuating rod 303. The protrusion portion is an integral part of the base 203, and they have the same thermal expansion coefficient. The third actuating rod 303 is fixed to the protrusion portion of the base 203. In the present embodiment, the effective length, the thermal expansion coefficient and the leverage factor of the actuating rods satisfy the following relation: $k_1 \times L_1 \times \partial_1 > k_3 \times L_3 \times \partial_3$, where $L_1$, $\partial_1$, $k_1$ are the effective length, the thermal expansion coefficient and the leverage factor relative to the base of the first actuating rod 301, and $L_3$, $\partial_3$, $k_3$ are the effective length, the thermal expansion coefficient and the leverage factor relative to the base of the third actuating rod 303. By adjusting the mounting position of the actuator, the leverage factor of the first actuating rod 301 relative to the base may be set as 0.62, and the leverage factor of the third actuating rod 303 relative to the base may be set as 0.5.

In the high temperature range, the first actuating rod 301 functions to contribute to compensation. The third actuating rod 303 is relatively shorter and has the aperture, so it does not contribute to compensation. At this time, a relation of wavelength/temperature may be obtained as follows:

$$d\lambda_1 = 0.62 \times 40 \times 10^{-3} \times 17.7 \times 10^{-6} \times 33 \times 10^{-12} \times dT_2 = 14.5 \times 10^{-12} \times dT_2 \quad \text{Formula 16}$$

In the low temperature range, due to thermal expansion, the first actuating rod 301 contracts. Since the first actuating rod 301 has a length larger than that of the third actuating rod 303, the amount of contraction of the first actuating rod 301 is relatively larger, and the first actuating rod 301 brings the third actuating rod 303 to move so that the aperture of the third actuating rod 303 closes up. At this time, the third actuating rod 303 starts to contribute to compensation. A relation of wavelength/temperature can be obtained as follows:

$$d\lambda_2 = 0.5 \times 29 \times 10^{-3} \times 17.7 \times 10^{-6} \times 33 \times 10^{-12} \times dT_2 = 8.5 \times 10^{-12} \times dT_2 \quad \text{Formula 17}$$

Figure 8C:
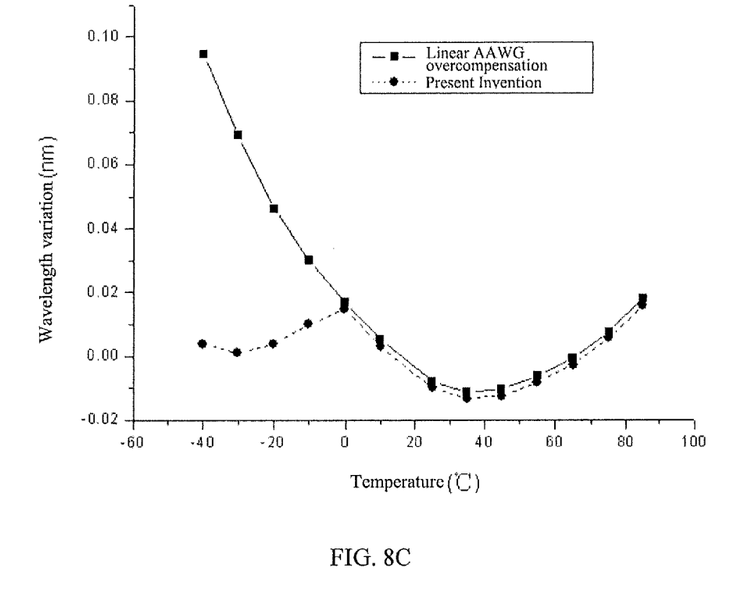
FIG. 8C is a graph showing comparison of a temperature curve of the third embodiment of the present disclosure and a temperature curve of a conventional linear compensation solution.

FIG. 8C shows a temperature curve after compensation. The drifting quantity of the wavelength is reduced from 105 pm to 28 pm within a range of −40° C.~85° C.

Figure 7:
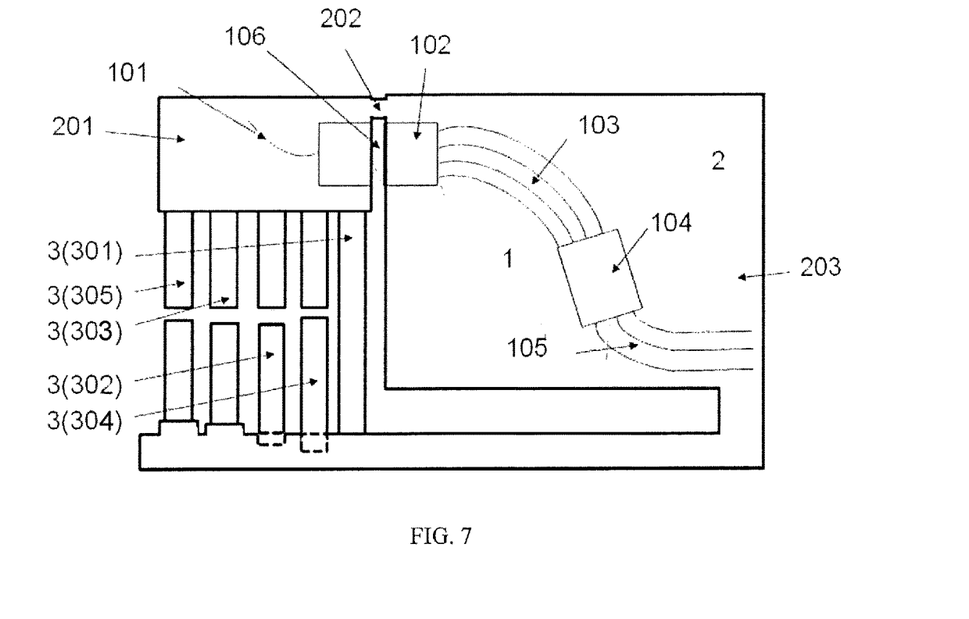
FIG. 7 is a schematic view showing a structure according to a fourth embodiment of the present disclosure.

FIG. 7 shows a fourth embodiment in which the actuator includes five actuating rods. As shown in FIG. 7, based on the first embodiment, the high temperature range and the low temperature range are divided into more segments and are compensated by two actuating rods, respectively. The temperature range of −40° C.~85° C. is divided into 5 segments, i.e., a room temperature range $dT_1$ of 10° C.~30° C. in which the first actuating rod 301 dominates to implement a linear full compensation, a high temperature range $dT_2$ of 30° C.~55° C. in which the second actuating rod 302 dominates to implement a linear overcompensation, a high temperature range $dT_3$ of 55° C.~85° C. in which the fourth actuating rod 304 dominates to implement a linear overcompensation with a larger compensating factor, a low temperature range $dT_4$ of −15° C.~10° C. in which the third actuating rod 303 dominates to implement a linear under-compensation, and a low temperature range $dT_5$ of −40° C.~−15° C. in which the fifth actuating rod 305 dominates to implement a linear under-compensation with a smaller compensating factor.

In this embodiment, the five actuating rods may be made of different materials and have different thermal expansion coefficients. For example, the first actuating rod 301 may be made of copper, the second actuating rod 302 and the fourth actuating rod 304 may be made of aluminum, and the third actuating rod 303 and the fifth actuating rod 305 may be made of stainless steel. Each actuating rod may have a different effective length. For example, the second actuating rod 302 and the fourth actuating rod 304 each may be longer than the first actuating rod 301. The dash line shown in FIG.

7 represents a part of the second actuating rod 302 and the fourth actuating rod 304 longer than the first actuating rod 301, where the base 203 has two recession portions into which the lower ends of the second actuating rod 302 and the fourth actuating rod 304 are fixed, respectively. The third actuating rod 303 and the fifth actuating rod 305 are shorter than the first actuating rod 301. FIG. 7 shows two protrusion portions formed as an integral part of the base 203. They have the same thermal expansion coefficient as the base 203 and are used to fix the third actuating rod 303 and the fifth actuating rod 305, respectively.

The thermal expansion coefficient, the effective length, and the leverage factor of the five actuating rods satisfy the following relation:

$$k_4 \times L_4 \times \partial_4 > k_2 \times L_2 \times \partial_2 > k_1 \times L_1 \times \partial_1 > k_3 \times L_3 \times \partial_3 > k_5 \times L_5 \times \partial_5 \quad \text{Formula 18}$$

where $L_i$, $\partial_i$, $k_i$ ($5 \geq i \geq 1$) are the effective length, the thermal expansion coefficient and the leverage factor relative to the base of the i-th actuating rod, respectively. For example, the first actuating rod 301 has an effective length $L_1$, a thermal expansion coefficient $\partial_1$, and a leverage factor $k_1$ relative to the base 2. The effective wavelength/temperature relations induced by these actuating rods on the base satisfy: the fourth actuating rod 304>the second actuating rod 302>the first actuating rod 301>the third actuating rod 303>the fifth actuating rod 305.

Figure 8D:
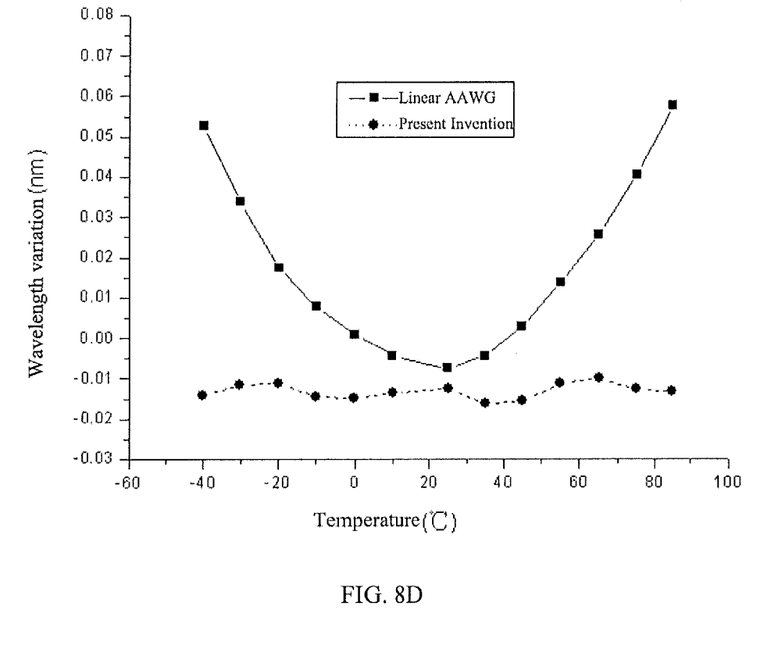
FIG. 8D is a graph showing comparison of a temperature curve of the fourth embodiment of the present disclosure and a temperature curve of a conventional linear compensation solution.

By adjusting the thermal expansion coefficient, the effective length and the leverage factor of each actuating rod to make a product of the three parameters of each actuating rod satisfy the relation of Formula 18, two segmental overcompensations may be implemented in the high temperature range, and two segmental under-compensations may be implemented in the low temperature range, so that the upturned parts at both left and right sides of the temperature/wavelength variation parabola curve after linear compensation may be flatten until it tends to be a horizontal line. The temperature curve after compensation is shown in FIG. 8D. The drifting quantity of the wavelength is reduced from 65 pm to 10 pm within a range of −40° C.~85° C.

Generally, the present disclosure proposes an apparatus for alleviating the nonlinear temperature effect of the arrayed waveguide grating comprising the integrated optical circuit base 2 and the actuator 3, which can effectively alleviate the wavelength/temperature nonlinear effect of the AWG chip 1. The integrated optical circuit base 2 includes the hinge 202 to separate the base 2 into two parts, and the two parts can move relative to each other about the hinge 202 to some extent. The AWG chip 1 may be divided into two parts, and the dividing line may be positioned at any position of the input slab waveguide, the arrayed waveguide or the output slab waveguide. The hinge 202 is aligned with the dividing line of the AWG chip 1, and the two divided parts of the AWG chip are mounted on the base with the two parts of the AWG chip at two sides of the hinge of the base, respectively. The actuator 3 may include a plurality of actuating rods having different effective lengths or thermal expansion coefficients mounted at two ends of the integrated optical circuit base 2 and having different leverage factors. As the temperature changes, due to thermal expansion, the actuator 3 makes the two parts of the integrated optical circuit base 2 to move relative to each other about the hinge 202 to compensate the drifting of the central wavelength of the AWG chip 1 with the temperature. The operation temperature range may be divided into a plurality of temperature segments, and the plurality of actuating rods of the actuator 3 may implement under-compensation or overcompensation respectively to achieve different wavelength/temperature coefficients in respective temperature ranges so that the residual nonlinear temperature effect of the linear compensation solution may be alleviated effectively.

Though the present disclosure has shown and described related specific embodiment reference in detail, those skilled in the art can understand that, various kinds of modifications can be made in form and detail without departing from the idea and range of the present disclosure, and all of these modifications fall into a range sought for protection of the claims of the present disclosure.

The invention claimed is:

1. An apparatus for alleviating a nonlinear temperature effect of an arrayed waveguide grating comprising an integrated optical circuit base for an arrayed waveguide grating chip and an actuator, characterized in that: the integrated optical circuit base includes a first region, a second region and a hinge connecting the first region and the second region, the hinge allows the first region and the second region to rotate and/or translate relative to each other;

the arrayed waveguide grating chip is fixedly disposed on the integrated optical circuit base, the arrayed waveguide grating chip is divided into two parts, which are fixed on the first region and the second region of the integrated optical circuit base, respectively;

the actuator includes two or more actuating rods having a thermal expansion coefficient different from that of the integrated optical circuit base, wherein: in different temperature ranges, the first region and the second region are mainly driven by different actuating rods to rotate and/or translate relative to each other at the hinge, so that the first region and the second region have a nonlinear displacement as the temperature changes, which brings the two parts of the arrayed waveguide grating chip to move relative to each other to accurately compensate drifting of a central wavelength of the arrayed waveguide grating chip in the different temperature ranges;

wherein the actuator includes a first actuating rod and at least one of a second actuating rod, and a third actuating rod which are fixedly connected to the first region and the second region of the integrated optical circuit base, the second actuating rod and the third actuating rod have the aperture provided in the middle parts thereof or between the second and third actuating rods and the first or second region of the integrated optical circuit base, the second actuating rod forms an overcompensation structure, and the third actuating rod forms an under-compensation structure, the actuating rods have a thermal expansion coefficient, an effective length and a leverage factor satisfying the following relation: $k_2 \times L_2 \times \partial_2 > k_1 \times L_1 \times \partial_1 > k_3 \times L_3 \times \partial_3$, where $L_1$, $\partial_1$, $k_1$ are the effective length, the thermal expansion coefficient and the leverage factor relative to the base of the first actuating rod, $L_2$, $\partial_2$, $k_2$ are the effective length, the thermal expansion coefficient and the leverage factor relative to the base of the second actuating rod, and $L_3$, $\partial_3$, $k_3$ are the effective length, the thermal expansion coefficient and the leverage factor relative to the base of the third actuating rod.

2. The apparatus for alleviating the nonlinear temperature effect of the arrayed waveguide grating according to claim 1, characterized in that: no aperture is provided in the middle of the first actuating rods or between the first actuating rods and the first or second region of the integrated optical circuit base, and the apertures of the second and third actuating rods are made to open or close up by thermal expansion of the second and third actuating rod in different temperature ranges.

3. The apparatus for alleviating the nonlinear temperature effect of the arrayed waveguide grating according to claim 1, characterized in that: one end of the second actuating rod is fixed in a recession portion of the base to form the overcompensation structure, and one end of the third actuating rod is fixed on a protrusion portion of the base to form the under-compensation structure.

4. The apparatus for alleviating the nonlinear temperature effect of the arrayed waveguide grating according to claim 1, characterized in that: products of the effective lengths, the leverage factors and the thermal expansion coefficients of the actuating rods are different from each other.

5. The apparatus for alleviating the nonlinear temperature effect of the arrayed waveguide grating according to claim 1, characterized in that: a difference of the thermal expansion coefficient of the actuator and the thermal expansion coefficient of the integrated optical circuit base is equal to or greater than 50%.

6. The apparatus for alleviating the nonlinear temperature effect of the arrayed waveguide grating according to claim 5, characterized in that: an aperture dividing the arrayed waveguide grating chip into two parts is provided at any position of an input slab waveguide or an arrayed waveguide or an output slab waveguide of the arrayed waveguide grating, and the aperture is positioned over the hinge on the integrated optical circuit base, the aperture has a width of 1 μm~50 μm.

7. The apparatus for alleviating the nonlinear temperature effect of the arrayed waveguide grating according to claim 6, characterized in that: the aperture of the arrayed waveguide grating chip is filled with refractivity matching material which has a refractive index the same as or close to the refractive index of the waveguide material of the divided portion of the array waveguide grating.

8. The apparatus for alleviating the nonlinear temperature effect of the arrayed waveguide grating according to claim 1, characterized in that: the actuator further includes a fourth actuating rod and a fifth actuating rod each having an aperture provided in a middle part thereof or between the fourth and fifth actuating rods and the first or second region of the integrated optical circuit base, one end of the fourth actuating rod is fixed in a recession portion of the base to form an overcompensation structure, and one end of the fifth actuating rod is fixed on a protrusion portion of the base to form an under-compensation structure, the actuating rods have a thermal expansion coefficient, an effective length and a leverage factor satisfying the following relation: $k_4 \times L_4 \times \partial_4 > k_2 \times L_2 \times \partial_2 > k_1 \times L_1 \times \partial_1 > k_3 \times L_3 \times \partial_3 > k_5 \times L_5 \times \partial_5$, where $L_i$, $\partial_i$, $k_i$ ($5 \geq i \geq 1$) are the effective length, thermal expansion coefficient and the leverage factor relative to the base of the i-th actuating rod.

* * * * *